United States Patent [19]

Huchital et al.

[11] 3,745,483

[45] July 10, 1973

[54] INERT GAS LASER WITH CONTINUOUS GAS FLOW

[75] Inventors: David A. Huchital, Trumbull; Jameson D. Rigden, Westport, both of Conn.

[73] Assignee: The Perkins-Elmer Corporation, Norwalk, Conn.

[22] Filed: July 6, 1970

[21] Appl. No.: 52,670

Related U.S. Application Data

[63] Continuation of Ser. No. 656,157, July 26, 1967, abandoned.

[52] U.S. Cl. ............................. 331/94.5, 330/4.3
[51] Int. Cl. ........................... H01s 3/22, H01s 3/09
[58] Field of Search ..................... 331/94.5; 330/4.3

[56] References Cited
UNITED STATES PATENTS
3,515,932   6/1970   King ............................. 313/207 X

OTHER PUBLICATIONS

Donin et al., J. of Applied Spectroscopy (Russ.), Vol. 5, No. 3, 1966, pp. 388-390, Avail. N.R.L.

Hernquist et al., IEEE J. Quantum Electronics, Vol. Qe-3, No. 2, Feb. 1967, pp. 66-72, QC 447 I2

Primary Examiner—Ronald L. Wibert
Assistant Examiner—R. J. Webster
Attorney—Edward R. Hyde, Jr.

[57] ABSTRACT

In a laser comprising an enclosure and a pair of electrodes therein, a stream of inert gas is flowed out through the bore of a hollow negative electrode. An electric discharge is produced in the stream by means of a potential difference between the electrodes. Ions from the discharge are attracted into the negative electrode, bombarding it and causing electron emission. The emitted electrons excite ions in the discharge to the upper laser energy level. Laser action is achieved by providing a resonant optical cavity.

9 Claims, 1 Drawing Figure

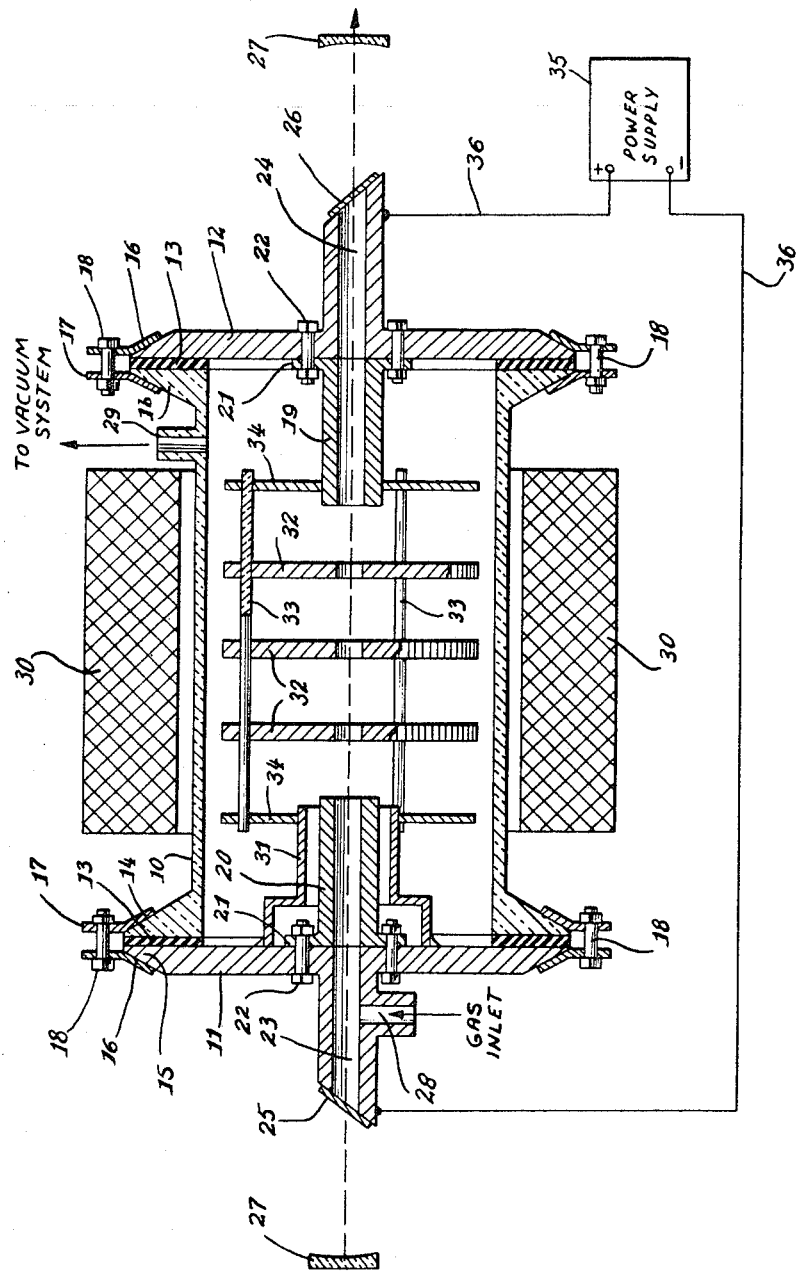

INERT GAS LASER WITH CONTINUOUS GAS FLOW

This is a continuation of application Ser. No. 656,157 filed July 26, 1967, and now abandoned.

This invention relates to inert gas lasers and more particularly relates to an inert gas laser which operates with high efficiency and high power output and which is also inexpensive to produce and maintain.

In general, a laser is made up of an active material which is capable of emitting stimulated radiation, a cavity resonant at the emission frequency and a mechanism for producing a population inversion between two levels of the energy level system of the active material which, on relaxation, will produce coherent radiation. The active material may be in the form of a solid, liquid or gas. The mechanism for producing the population inversion may be exposure to incoherent radiation or some form of electrical excitation. The resonant cavity may be in the form of a pair of mirrors, one of which s partially transmissive, spaced a suitable distance apart. This invention is concerned with lasers in which the active material is an inert gas, particularly argon, xenon or krypton. Other inert gases such as helium or neon may also be used.

Lasers utilizing the noble gases have several advantages over other lasers. Specifically, the radiation produced is in the visable spectrum in a range for which there exist efficient detectors, and the power at which the device is operated can be very high. However, several problems limit the effectiveness of inert gas lasers. For example, the tube in which the discharge is confined is subject to bombardment and destruction by high energy ions of the gas provided in the chamber. This also tends to reduce the quantity of gas in the chamber to an insufficient level causing the device to fail. Also, previous devices have been highly suseptible to impurities introduced by such mechanisms as small leaks, outgassing due to the high temperature of operation and decomposition products formed by the ion bombardment of the chamber wall. This is particularly true of devices using heating elements for producing cathode emission. The only previous solution of these problems has been to use extreme care in the fabrication of these devices; however, this greatly increases the expense of fabrication. Also, since devices which fail cannot economically be repaired, an equally expensive replacement is required. The present invention is directed to an inert gas laser which includes the advantages of these materials but which avoids the above-mentioned problems and is, at the same time, simple and inexpensive to construct and maintain in operation for an extended period.

It is accordingly an object of the present invention to provide a novel inert gas laser which exhibits improved performance and power output.

It is a further object of this invention to provide a new and improved inert gas laser which is of simple and inexpensive construction, and which can be simply and inexpensively maintained.

Briefly, the invention is incorporated in the general structure of an inert gas laser which consists of a resonant optical cavity, an enclosure associated with the cavity, and electrodes, namely, an anode and a cathode, for establishing an electric field within the enclosure along the axis of the cavity.

In accordance with this invention, the cathode is hollow and an inert gas is flowed continuously through the bore of the hollow cathode into and through the enclosure. At least the internal surface of the cathode comprises a material which, when bombarded by ions, emits electrons. The cathode is suitably a tube of tantalum. An outlet and pump means are provided to establish a flow of gas through the enclosure. When the field is set up, a discharge is established in the gas and ions produced therein are electrically attracted into the bore of the cathode and bombard the cathode surface, causing the emission of electrons. These electrons are accelerated out of the cathode and collide with ions in the discharge, exciting them to an upper energy level to produce the necessary population inversion. As the ions fall to a lower energy level, radiation is emitted and lasing is achieved by reflection of the radiation within the resonant cavity.

For operation in the aforesaid manner there must be a continuous stream of gas flowing through the cathode in the direction of the electron emission (into the enclosure), there must be a sufficient pressure, about 1 Torr for example, at some point in the bore of the cathode for electron emission to occur — such point thus becoming the point where electron emission occurs, and there must be a pressure gradient between the bore and the emission end of the cathode to produce a continuous gas flow. If the gas flow stops or if the pressure in the cathode drops too low, the discharge ceases.

Some of the features and advantages of the improved gas laser of this invention which are of particular interest — in addition to the improved performance and power out — are that the cathode is simpler and less expensive than cathodes used in previously known ion lasers. In this laser the cathode is simply a tubular piece of a suitable material, such as tantalum, rather than a specially fabricated composite structure, such as a barium impregnated tungsten matrix, of the type used in previous inert gas lasers. This laser does not require a heater for the cathode. Also the cathode is not subject to poisoning due to contaminants or to sputtering; substantially pure gas being supplied from a supply tank enters the cathode close to electron emission point and thus has no opportunity to pick up contaminants from the laser enclosure, and the higher gas pressure is at the electron emission or discharge point while the lowest pressure is outside and beyond the cathode in the direction of the emission so that the natural flow direction keeps contaminants from entering the bore of the cathode and away from the emission point.

Other features, objects and advantages of this invention will be apparent from the following detailed description of an illustrative embodiment shown in the accompanying drawing in which:

FIG. 1 is a longitudinal cross-sectional view of a laser constructed in accord with this invention.

The device shown in FIG. 1 comprises an enclosure such as a glass cylinder 10 secured to metal end members 11 and 12 through heat resistant gaskets 13. Hermetic seals are provided, for example by means of interlocking flanges 14, 15 on the glass and metal members which are secured by means of overlapping collars 16 and 17 and bolts 18. Within the cylinder 10, anode and cathode electrodes 19 and 20 are provided. As shown, these comprise hollow metal tubes secured over openings in the end members 11 and 12 by means of flanges 21 and bolts 22. The electrodes 19 and 20 include apertures 23 and 24 to permit passage of the emitted radiation to Brewster windows 25 and 26 which comprise fused silica discs sealed to the end members 11 and 12, and function to seal the enclosure. The optical cavity is defined by mirrors 27, one of which is reflective while the other is from one-half to 5 percent transmissive to permit extraction of a useful beam. The mirrors may be located either inside or outside the enclosure. The end member 11 at the cathode end also includes aperture 28 to permit introduction of a stream of gaseous material, including an inert gas into the enclosure through the hollow cathode. A continuous flow is produced by means of outlet 29 which is attached to a vacuum system. Finally, the laser includes means for establishing a magnetic field in the discharge region between the anode and cathode electrodes which may comprise either a solenoid, illustrated at 30, or a permanent magnet.

The preferred embodiment illustrated in FIG. 1 also includes a reflective shield 31 mounted over the cathode to reduce radiative heat loss therefrom and sputtering damage thereof and a plurality of discs 32 mounted within the enclosure so that apertures therein are aligned with the axis of the anode and cathode electrodes. In FIG. 1, these are mounted on quartz rods 33 which extend from similar discs 34 fitted onto the anode and the cathode shield.

The discs 32 are preferably thermally conductive. If they are also electrically conductive, they must be insulated from one another and from the anode and cathode. The discs function to constrict the discharge to an axial path between the anode and the cathode. If the discharge is not sufficiently restricted by means such as these discs, the resulting plasma is of low current density and may not be capable of high laser power. Thick discs are preferred since they can best withstand a high rate of ion bombardment, but if the discs are too thick with respect to the aperture diameter, the discharge tends to jump from disc to disc. Accordingly, it is preferred that the ratio of disc thickness to aperture diameter be not greater than about 5. If this condition is met, the disc spacing is of lesser importance; any spacing from the minimum necessary to electrically insulate adjacent discs up to a maximum of about 25 mm. may be used. It is noted that neither the shield nor the discs are required to achieve lasing; however, substantial increases in energy output are obtainable when these additional elements are included.

The discs 32 may also be apertured at other locations than the center, or as illustrated in the lower half of the Figure, circumferential portions thereof between support rods 33 may be removed. The purpose is to reduce the weight load on support rods 33 to prevent bending and also to allow gas communication to prevent an unbalanced pressure gradient distribution. If such openings are provided, they are preferably misaligned so as to avoid a continuous path from anode to cathode through which the plasma discharge might pass. The probability of this happening depends upon the strength of the applied magnetic field; if a strong magnetic field is provided, the discharge passes through the center aperture despite the presence of a continuous path through other slots or apertures.

Finally, power supply 35 supplies the D. C. operating voltage through leads 36 to the anode and cathode. The magnitude of the voltage required depends primarily on the length of the laser. A minimum voltage of approximately 40 to 50 volts is necessary to operate the cathode, plus approximately 2 volts per centimeter of discharge length. In the illustrated device, the discharge length is approximately 10 centimeters and the optimum operating voltage is therefore about 70 volts.

In accord with the present invention, the cathode electrode comprises a material which, when bombarded by gas ions, emits electrons. For example, tantalum, tungsten or other thermionic emitters are suitable materials although the emission which actually occurs appears to be a combination of thermionic emission, secondary emission and field emission. Low work function alloys have also been used. In operation, a gas flow preferably consisting of a selected inert gas such as argon, krypton or xenon is established through the enclosure, an electric field is provided between the anode and the cathode, and a discharge is initiated by suitable means such as by establishing a temporary rf field in the gas stream. At suitable values of field, gas flow and current, ions from the discharge re-enter the cathode against the flow direction of the gas and strike the internal surface thereof. The bombarded region of the cathode quickly heats to a temperature at which it emits electrons which are accelerated into the discharge region due to the negative cathode potential. This process proceeds most readily where the pressure within the cathode is about 1 Torr. These accelerated electrons collide with ions in the discharge, raising the ions to an excited energy level. As the ions fall back to the normal energy level, radiation is emitted. Upon reflection thereof in the resonant cavity formed by the mirrors, stimulated emission of radiation is achieved and the device lases.

In part, the advantages of this invention arise from the provision of a novel laser having a simple cathode which can withstand attack by the various impurities which may contaminate the enclosure and to the provision of a continuous gas stream through the enclosure which avoids the previous difficulties of gas cleanup and excessive impurity contamination. The cathode electrode comprises a thick metallic tube which is impervious to attack by impurities which may be entrained with the inert gas or to impurities which may be produced by decomposition of the walls of the enclosure. Furthermore, excessive buildup of such impurities and depletion of the argon required for the discharge are overcome by the continuous pumping of the enclosure through outlet 29 and by the continuous introduction of inert gas through the cathode.

Thus, since the difficulties which have required previous inert gas lasers to be of extremely complex, precise, and expensive construction are overcome and the simplified construction illustrated in FIG. 1 may be used. For example, the glass cylinder may comprise any commercially available high temperature glass and the argon introduced through the cathode may be of commercial grade purity rather than high purity.

By way of example, the structural details of a particular laser constructed as illustrated in FIG. 1 were as follows:

The cathode consisted of a tantalum tube 8 cm. long and 5 mm. in diameter. The wall thickness of the tube was 0.025 inches. The anode tube was similar. THe glass cylinder was a Pyrex tube 1½ inch in diameter. The conductive discs were graphite and 8 discs one-fourth inch thickness were spaced approximately 15 mm. apart over the discharge path of 18 cm.

To operate the device, the enclosure was first evacuated by means of a 15 cubic foot per minute vacuum pump. Next, argon was introduced through the cathode at a rate such that the pressure at the exhaust port was in the range of 0.5 to 1 Torr. A potential of 300 volts was established between the anode and cathode and a discharge was initiated by rf ionization. After a few seconds to allow cathode heating, the argon flow was decreased until the pressure at the outlet port was approximately 10 milli-Torr and a pressure of 1 Torr was established at a point within the hollow cathode. A visible hot spot was observed a few tube diameters back from the tip of the cathode. At a threshold current of 4 amperes, lasing was achieved at a wavelength of 4,880 A units. A power output of 0.5 watts was achieved at a current of 21 amperes.

In general, the present invention is directed to the use of any cathode structure wherein the inert gas is passed through the cathode and re-entrant ions hit the walls at some point to cause emission. For example, the cathode may comprise a refractory supporting structure having an inner lining of emissive material such as tantalum.

The operating parameters of a particular device, such as voltage, current, magnetic field, and pressure may be varied to optimize the power output and efficiency. A particular advantage of this invention is that the magnetic field may be as low as 700 to 800 Gauss, thus permitting the use of a permanent magnet. The additional weight and complexity of an electromagnet is eliminated.

In the illustration of FIG. 1, inert gas is shown introduced into he enclosure through the cathode and out the other end of the enclosure. The particular flow path through the enclosure is not critical, however; it is only necessary that the gas flows from inside the cathode into the enclosure at a sufficient rate to provide the necessary pressure gradient within the cathode.

As previously noted, prior inert gas lasers have required extremely complex structure which were highly sensitive to operational destruction. When such destruction occurs, the entire unit must be replaced. The structure provided in accordance with the present invention is not sensitive to these difficulties because the cathode is not sensitive to contamination or to gas flow turbulence, thus permitting the remainder of the structure to be less precise and also permitting the use of the continuous gas flow concept. The only factor which substantially affects the lifetime of the structure is sputtering of the cathode material. The lifetime of the cathode can be maximized by providing a tube having a wall thickness approximately equal to the inner diameter. When the cathode is eventually destroyed it is a simple matter to replace it by simply removing the end structure and substituting a new tube. Such replacement of damaged parts is not possible in previous argon lasers becaus the entire structure must be kept as free as possible of contaminants. In the structure of the present invention contamination does not matter since the cathode is not sensitive and since any impurities are removed by gas flow.

In addition to the advantages previously noted, the lasers of this invention can be used with input current of a few hundred amps or more without damage to the cathode. If increased power is desired the length of the laser selected can readily be increased. To decrease the cost of fabrication, all cathode and anode structures may be of a standard size and a variety of power ratings may be supplied by manufacturing a series of lengths of magnet, tube and disc structures.

A particular advantage of lasers in accord with this invention is that the gas supply may be changed at any time, even during operation, simply by switching an appropriate valve means to an alternate gas supply. For example, due to the expense of krypton and xenon and due to the fact that a relatively large quantity of gas may be used during initiation of the discharge, it is possible to start the discharge with argon and switch to the desired gas after the discharge has been established. This mehtod of operation has been successfully demonstrated.

From the foregoing, it can be seen that inert gas lasers provided in accord with the present invention embody several advantages over those of prior art. Specifically, an inexpensive and readily produced structure is provided which is able to be produced and maintained in a practical environment and is not limited to the complex and precise requirements of the prior art. It will be clear to those skilled in the art that many changes and modifications may be made in the specific structure shown and described above without departing from the spirit of this invention.

What is claimed is:

1. An gas ion laser structure comprising
a resonant optical cavity,
an enclosure within the cavity,
an anode electrode and a cathode electrode
in the enclosure defining a discharge region between them, means for connecting the anode and cathode to an external power supply for establishing an electrical field in the discharge region and for maintaining a discharge in an inert gas in the enclosure,
said cathode being hollow and having a bore aligned with said discharge region,
and a gas flow inlet opening into the bore for introducing a gas into the bore,
said enclosure having a gas flow outlet for a gas from the bore of the cathode to flow through said discharge region to said outlet,
at least the interior of the bore of the cathode comprising a material that emits electrons upon ionic bombardment thereof, and
means for providing a continuous flow of an inert gas from said inlet, out through the bore of the cathode into said discharge region and out said outlet under pressure such that a sufficient pressure is provided at a location within the bore of the cathode for electron emission to occur therein by bombardment of said material of the bore by ions from a discharge that is produced in an inert gas in the enclosure, whereby electrons emitted from the bore of the cathode excite ions in said disharge to create a population inversion therein.

2. The laser of claim 1 in which said pressure at said location in the bore of the cathode is about 1 Torr.

3. The laser of claim 1 in which the cathode is a hollow tubular element having its bore aligned with said resonant cavity.

4. The laser of claim 1 including a plurality of apertured discs in the enclosure, coaxial with the cathode and spaced apart between the cathode and anode for restricting a discharge in said discharge region to a limited path within the enclosure.

5. The laser of claim 4 in which said enclosure comprises a cylindrical glass envelope having an inner diameter substantially larger than the outer diameter of said discs.

6. The laser of claim 4 in which one of the discs is mounted on one of the electrodes and the remainder are mounted on support rods extending from said one disc.

7. The laser of claim 6 in which the ratio of disc thickness to the diameter of the coaxial apertures therethrough is not greater than 5:1.

8. The laser of claim 10 including means for applying a magnetic field in said discharge region.

9. The laser of claim 10 including a reflective shield around the cathode for reducing radiative heat loss therefrom.

* * * * *